United States Patent Office 3,584,113
Patented June 8, 1971

3,584,113
PROCESS FOR THE PRODUCTION OF MEDICAL PREPARATIONS HAVING SUSTAINED RELEASE OF THERAPEUTICAL EFFECT
Toshio Takebe and Shimesu Motoyama, Saitama Prefecture, and Ryoichi Machida, Tokyo, Japan, assignors to Eisai Kabushiki Kaisha, Tokyo, Japan
Filed Aug. 19, 1968, Ser. No. 753,678
Claims priority, application Japan, Aug. 31, 1967, 42/55,487, 42/55,488
Int. Cl. A61k 27/12
U.S. Cl. 424—19                                         3 Claims

ABSTRACT OF THE DISCLOSURE

A novel process for the production of medical preparations having sustained release of the therapeutical activity into digestive organs which process essentially comprises atomizing an aqueous mixture containing a medical substance soluble in water and a water-missible substance capable of converting into a water-insoluble substance when the aqueous mixture is brought into an anhydrous condition by atomizing. The invention is also concerned with a process for providing the medical preparations having anti-ulcer effect by blending the powdery, fine particles containing an anti-chlorine substance and the powdery, fine particles of an antacid, the both particles having almost same sizes ranging approximately from 10 microns to 1000 microns.

---

Figure 1:
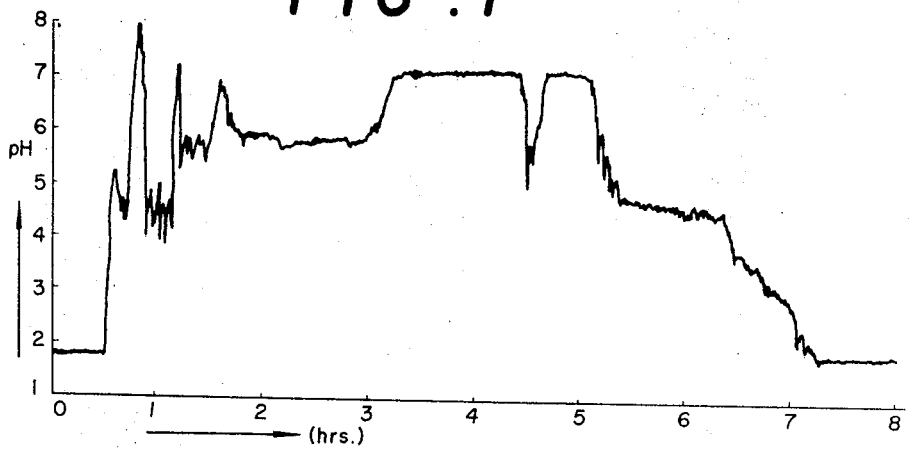

This invention is concerned with the production of the medical preparations having a sustained release of therapeutical effect suitable for oral administration.

In one aspect, the invention relates to a process for the production of medical preparations having a sustained release in digestive organs which comprises admixing in water a soluble medical substance, with or without a substantially water-insoluble, inert, powdery substance, and a substance which is capable of converting into a water-insoluble matter when the resulting aqueous mixture is brought to an anhydrous condition, and atomizing the mixture, thus obtained through a spray drier to form powdery, fine particles.

In another aspect, the present invention relates to a production of the medical preparations having a sustained release of anti-ulcer effect by blending the anti-choline substance-containing powdery fine particles and the antacid-coniaining powdery fine particles. The former particles are prepared in accordance with the atomizing process as mentioned in the preceding paragraph, whereas the latter particles are prepared by atomizing an aqueous mixture containing an antacid and a water-soluble binding material through a conventional spray drying.

The term "powdery, fine particles" as used herein and in the claims is intended to denote the fine granules having a good fluidity and the particle sizes of approximately from 10 microns to 1000 microns and capable of handling with ease without dusty scattering when a prescription, for example, is dispensed.

Many medical compositions possessing sustained release of the therapeutical efficacy suitable for oral administration have hitherto been available in the market.

It has been found that the chemical stability of propanterine bromide, for example, which is used as one of the active ingredients in the known preparations is considerably lowered when the same is admixed in a plain form with one of the hereinaftermentioned silicious antacid substances. Xanthic acid is liberated from propanterine bromide as the result of hydrolysis of the beta-isopropyl-aminoester moiety thereof. The silicious antacid substances owing to their adsorption property will adsorb the anti-choline substance during the production of the preparations according to the known processes. The anti-choline substance once adsorbed is partially retained without release from the preparations when orally administrated. There is further a disadvantage that the adsorption behavior presented by the antacid renders determination of the anti-choline substance in the finished preparation difficult. Since the hithertoknown anti-ulcer preparations when orally administered exhibit their anti-choline action within about 15–30 minutes, and around 30 to 60 minutes after the administration the anti-choline effect disappears almost completely. With such a transitory anti-choline effect, patients suffering from gastric ulcer are painful especially at midnight as their sleeps are disturbed.

The known medical preparations have been prepared either by coating a shaped soluble medicine with a protective layer of wax or resin; by chemical treatment of soluble medicine to convert into its sparingly soluble derivative; or by treatment of the soluble medicine with an ion-exchange resin to form a difficultly soluble one and the like.

These known preparations are often defective in that the sustained therapeutical effect presented by the preparation coated with wax or resin varies considerably depending upon the surface areas of the coated granules, that is, the sizes of the granules; the particles having diameters ranging from 10 microns to 1000 microns which are particularly suitable for compounding, when orally administrated, are liable to be absorbed rapidly by digestive organs resulting in a sudden and temporal elevation of the concentration in blood system and thereafter the concentration will rapidly diminish within a short time. The treatment with ion-exchange resin enables to form the granules having desired particle sizes. The sustained therapeutical effect presented by such granules is, however, considarably affected by the personal pH-value of the liquid in the digestive organs of the individual patient and therefore is not satisfactory.

In addition, it is obvious that the ion-exchange process can not be applied without exception to the medical products which may have different chemical structures and accordingly different chemical properties. Actually, the water-soluble medical substances have been changed by a chemical method to the sparingly soluble substances. For instance, diphenhydramine hydrochloride was converted into the corresponding tannic acid salt, pyridoxine hydrochloride into the corresponding alkyl sulfonate by double decomposition between the former and a sodium alkylsulfonate.

Now, we have found a novel process for the production of powdery, fine particles having an enhanced durability of the therapeutical effect without deficiencies such as those presented by the hithertoknown products.

The production of the powdery, fine particles of the medical preparations according to the present invention can be conducted by atomizing the aqueous homogeneous mixtures as disclosed in the opening paragraphs by employing a conventional spray drier. There is thus obtained the powdery, fine particels having diameters ranging from approximately 10 microns to 1000 microns and a sustained therapeutical effect, when orally administered.

The atomizing process according to the present invention is distinguished from the hithertoknown spraying processes which is carried out, for example, by atomizing a molten mass prepared by melting under mild heat a mixture of a medicine with a water-insoluble and fusible waxy substance as the base and spraying out under pressure the melt through small orifices. This process has a disadvantage that certain medicines often are susceptible of a partial thermal decomposition. According to another known spraying process, a production of the coated medical preparation is conducted by atomizing a mixture of the medicine and a water-insoluble waxy or resinous substance dissolved in an organic solvent. This process, however, has an unavoidable danger owing to inflammability of the organic solvent, and therefore requires an expensive apparatus to make assurance of safety to an accidental hazard.

Contrary to the above, the present invention is characterized in that the powdery, fine particles having the afore-specified sizes can be produced without danger from an aqueous system which contains as binding agent a substance capable of converting into a water-insoluble matter when it is brough into anhydrous state.

As active ingredient to be employed in the process of the instant invention, there may be exemplified without limitation vitamin $B_1$ hydrochloride, diphenhydramine hydrochloride, chlorophentelmine hydrochloride and caffeine as well as various anti-choline substances such as panterine bromide, propanterine bromide, benactizine methobromide, atropine-N-methyl bromide, dicyclomine hydrochloride and the like.

As for antacids, there may be mentioned magnesium silicate, aluminium silicate, aluminium methasilicate, aluminium-magnesium methasilicate and the like.

As the compounds convertible into water-insoluble substance under the dehydration procedure, which may be employed in the process of the present invention, there may be mentioned the following compounds:

(a) Condensation products derived from urea and formaldehyde, and in general, methylol urea and methylene urea as well as the polymerization products thereof, so far as the latter are in an intermediate polymerization stage soluble in water.

The resinous substances are insolubilized by the progression of polymerization during the spray drying.

(b) Emulsified artificial resins prepared by an emulsion polymerization process such as, for example, acryl ester, vinyl acetate, crotonic ester and co-polymers thereof.

The insoluble resins are formed by agglomeration of the resin particles by destruction of the emulsion system caused by the spray drying.

(c) Ammonium salts of resin-forming acids, such as, ammonium salts of acrylic and crotonic acids or co-polymers of these acids with vinyl acetate, acryl ester and crotonic ester.

The insoluble resinous matters are formed by splitting off gaseous ammonia from the salts leaving the resinous acids during the spray drying.

(d) Polyvinyl alcohol in a form of aqueous solution obtained by dissolving a completely saponified polyvinyl alcohol.

The polyvinyl alcohol crystallizes out and is insolubilized in the course of atomizing.

The exemplification of the substantially water-insoluble powdery substances to be optionally incorporated into the abovementioned aqueous mixture include starch, pulverized cellulose, cellulose derivatives, metallic salts of fatty acid such as calcium stearate, magnesium stearate and the like, as well as the inorganic substances such as, for example, talcum, kaolin, titanium dioxide, calcium phosphate and the like conventionally employed as an additive in the shaping procedures of medical preparations. They are preferably employed in a finely pulverized form. They should not exhibit an alkaline reaction in an aqueous medium.

As for the binding materials suitable for the formation of the powdery, fine particles of antacid by atomizing the aqueous mixture containing said active agent, there are mentioned sodium carboxymethyl cellulose, methyl cellulose, partially saponified polyvinyl alcohol and the like.

The releasing velocity of the therapeutical agent from the products obtained by the process of the present invention can be controlled at will depending upon the contemplated utility of the final products by suitably selecting the kind of medicines, the water-insoluble resin-forming material and the substantially water-insoluble pulverized substances as additive as well as the relative concentrations thereof and/or by controlling the average sizes of the resulting fine particles.

The following examples will further illustrate this invention. The parts specified are parts by weight.

EXAMPLE 1

60 parts of a urea-formaldehyde resin containing 38% of the resinous matter sold by Toyo Koatsu K. K. under trade name "Uramine P–1500" are dissolved into 200 parts of distilled water. To the mixture are added 20 parts of vitamin $B_1$ hydrochloride. 30 parts of magnesium stearate are thoroughly dispersed thereinto with stirring to produce a homogeneous slurry. By atomizing the slurry through a nozzle of a spray drier, there is obtained a dried, white micropulverized powder having diameters of approximately 300 microns to 450 microns. The resulting preparation has a sustained therapeutical effect.

EXAMPLE 2

50 parts of polyvinyl alcohol which is a complete saponification product having a polymerization degree of 150 are dissolved into 250 parts of hot distilled water at 90° C. to 100° C. To this solution are dissolved 5 parts of diphenhydramine hydrochloride. The solution thus obtained is atomized through the small apertures provided with a rotating disk of a spray drier. There is obtained a dried white powder having the particle sizes of about 100 microns to 150 microns. The product has a sustained therapeutical effect.

EXAMPLE 3

10 parts of chlorophentelmine hydrochloride are dissolved into an aqueous emulsion consisting of 20 parts of an ethyl acrylate emulsion containing 50% of the ethyl acrylate resin which has been prepared by an emulsion polymerization procedure, and 200 parts of distilled water. 40 parts of corn starch are dispersed thereinto under stirring to obtain a homogeneous slurry. The slurry is atomized through a spray drier in accordance with Example 1. There is obtained a white powder having the particle sizes of approximately 300 microns to 500 microns. The product shows a sustained therapeutical effect.

EXAMPLE 4

10 parts of caffeine are dissolved under heat into 250 parts of distilled water containing 10 parts of ethyl alcohol. To the solution are added 40 parts of ammonium salt of polyacrylic acid having polymerization degree of 200. The spray drying is carried out in accordance with the procedure of Example 1 resulting in the white, fine particles of about 500 microns having a durable efficacy.

EXAMPLE 5

(a) 40 parts of polyvinyl alcohol (a completely saponified product having polymerization degree of approximately 200) are dissolved in 200 parts of distilled water at a temperature of 90°–100° C. 5 parts of propanterine bromide are dissolved in the solution. 55 parts of potato starch are thoroughly dispersed thereinto to form a homogeneous slurry. By atomizing the slurry in a conventional spray drier, there are obtained fine particles having the sizes of from 100 microns to 150 microns (the powder (a)). The powder shows a sustained release of therapeutical ingredient.

(b) 3 parts of polyvinyl alcohol (a partial saponification product of the saponification degree of 80% and the polymerization degree of 500) are dissolved in 200 parts of distilled water. 97 parts of magnesium silicate are disposed throughout the solution to form a homogeneous slurry. The slurry is atomized through a spray drier provided with a rotating disk to obtain white, fine particles having the sizes of from 100 microns to 150 microns (the powder (b)).

100 parts of the powder (a) and 400 parts of the powder (b) are blended in a V-shaped mixer to obtain a homogeneous compound.

EXAMPLE 6

(a) 30 parts of an aqueous emulsion of acrylic ester containing 50% of the solid resin which was previously prepared by emulsion polymerization method are poured to 250 parts of distilled water. To the solution are added 10 parts of panterine bromide followed by dispersing 75 parts of calcium stearate to obtain a homogeneous slurry.

By atomizing the slurry in accordance with the preceding example, there is obtained white, fine powder having the particle sizes of from about 150 microns to about 200 microns (the powder (a)).

(b) 3 parts of sodium carboxymethyl cellulose are dissolved in 200 parts of distilled water. To the solution are dispersed 57 parts of magnesium silicate and 400 parts of aluminum hydroxide gel to obtain a homogeneous slurry. The slurry is atomized in accordance with the procedure of Example 1. There is thus obtained white, fine powder having the particle sizes of from about 150 microns to about 200 microns (the powder (b)).

100 parts of the powder (a) and 900 parts of the powder (b) are blended thoroughly in a V-shaped mixer to obtain a homogeneous compound.

EXAMPLE 7

(a) 80 parts of urea-formaldehyde resin containing 38% of the resinous matter (Uramine P–1500) are introduced to 200 parts of distilled water. To the mixture are dissolved 15 parts of propanterine bromide and 3 parts of sodium copper-chlorophylline. To the solution are added 55 parts of calcium secondary phosphate to obtain a homogeneous slurry. The latter is atomized through the small nozzles of a spray drier. There is thus obtained green powder having the particle sizes of from about 300 microns to about 450 microns (the powder (a)). The powder shows a sustained release of the therapeutical ingredient.

(b) 30 parts of methylcellulose (50 cps.) and 27 parts of sodium copper-chlorophylline are dissolved in 2 500 parts of distilled water. To the solution are dispersed 900 parts of aluminum-magnesium methasilicate to form a homogeneous slurry. The slurry is atomized in accordance with the procedure of Example 7, Item (a). There is thus obtained a green fine powder having the particle sizes of from about 300 microns to about 450 microns (the powder (b)).

100 parts of the powder (a) and 900 parts of the powder (b) are well blended in a V-shaped mixer to obtain a homogeneous compound.

EXAMPLE 8

(a) 45 parts of polyvinyl alcohol (a completely saponified product having the polymerization degree of 150) are dissolved under heat at a temperature of 90°–100° C. in 200 parts of distilled water previously added with 10 parts of methanol. 5 parts of propanterine bromide are dissolved in the solution to obtain a homogeneous slurry.

The slurry is then atomized through a spray drier provided with a rotating disk. There is thus obtained a white, fine powder having the particle sizes of from about 50 microns to about 100 microns, which has a sustained release of the therapeutical ingredient (powder (a)).

(b) 3 parts of polyvinyl alcohol (a partially saponified product having saponification a degree of 80% and the polymerization degree of 500) are dissolved in 200 parts of distilled water previously mixed with 10 parts of methanol. To the solution are dispersed 97 parts of magnesium silicate to obtain a homogeneous slurry. The latter is atomized through a spray drier provided with a rotating disk. There is thus obtained a white powder having the particle sizes of about 50 microns to about 100 microns (the powder (b)).

100 parts of the powder $a$ and 400 parts of the powder ($b$) are mixed well in a V-shaped mixer to obtain a homogeneous compound.

The outstanding sustained release characteristic of the medical preparations obtained by the process according to the present invention when brought into contact with the gastric and intestinal fluids will be seen from the data of the following clinical and laboratory tests.

(I) Clinical tests (a) 2 grams of the preparation of Example 6 were orally administrated to a male patient of 41-year-old suffering from gastric ulcer and the change in the initial pH-value having 1.7 of the gastric fluid was observed by graphical recording for several hours with Gastro-Intestinal pH-Telemeter Model TPH–04 sold by Wireless Research Laboratory of Matsushita Electric Industrial Co. Ltd. of Osaka, Japan. The results obtained are shown in the appended FIG. 1.

Figure 2:
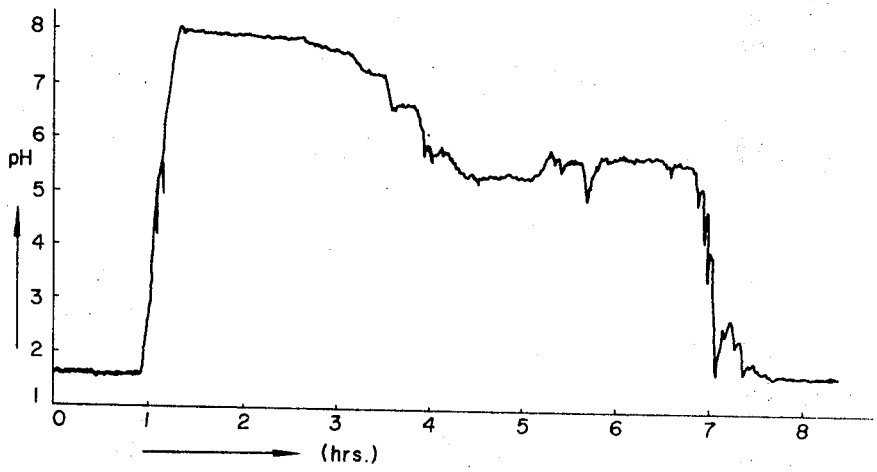

(b) A similar test was repeated by oral administration of 2 grams of the preparation same as that used in the preceding test to a male patient of 38-year-old suffering from gastric ulcer. The results are shown in FIG. 2.

Gastro-Intestinal pH-Telemeter employed in the above tests is composed of (a) A transmitter capsule provided with a glass electrode at a terminal of the capsule and a mercury cell at the other terminal, the capsule being for the insertion into stomach of patients by means of an attached hanging line;

(b) a receiving loop antenna;

(c) a receiving apparatus; and (d) a recording means.

(II) Measurement of sustained release of effective ingredient (1) Simulated gastric and intestinal fluids were prepared as follows:

(a) Simulated intestinal fluid.—15 grams of sodium bicarbonate and 2.8 grams of pancreatin were dissolved in an amount of distilled water and the whole was made up to total 1000 ml. There was obtained a slightly turbid solution having pH of about 8.3.

(b) Simulated gastric fluid.—2.0 grams of NaCl, 3.2 grams of pepsin and 24 ml. of a diluted hydrochloric acid were dissolved into an amount of distilled water and the whole was made up to total 1000 ml. A slightly turbid solution was thus obtained having pH equals 1.2.

(2) Measurement 1

1 gram of the preparation of Example 6 was weighed into a conical flask of a 300 ml. capacity provided with a glass stopper. 200 ml. of the simulated intestinal fluid were poured into the flask and the latter was shaked 50 times per minute in a thermostat kept at the temperature of 37°±0.5° C. Each 4 ml. fraction of the fluid was taken as test sample by means of a measuring pipette periodically after the lapse of 0.5, 2, 4, 6, 8 and 10 hours respectively. The sample taken up was each time diluted with a portion of the residual fresh simulated intestinal fluid to make up to total 25 ml.

The released panterine bromide in the respective fluid sample was measured by observation of the degree of optical absorption at the wave length of 282 m$\mu$ of the fluid by means of Beckmann photometer.

Figure 3:
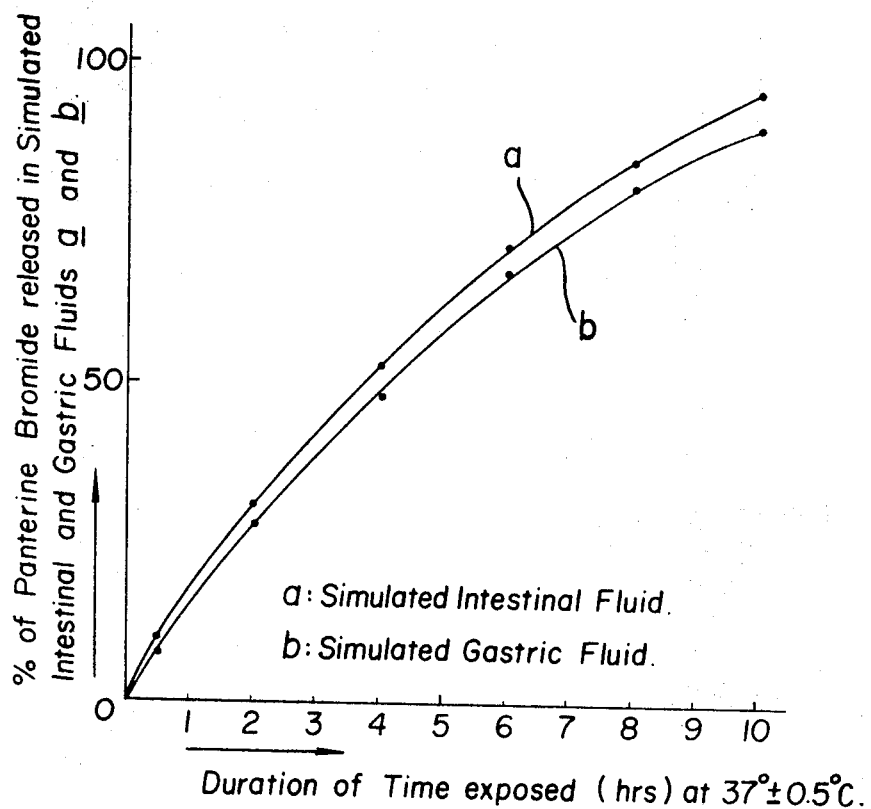

The results are shown in FIG. 3, Curve $a$.

(3) Measurement 2

Similar experiment was conducted by using the simulated gastric fluid. The results observed are shown in FIG. 3, Curve $b$.

What is claimed is:

1. A process for the production of medical powdery fine insoluble polymerized resin particles providing a sustained release of therapeutical activity suitable for oral administration comprising admixing in water a water-soluble medical ingredient and a water-soluble resin capable of conversion into a water-insoluble resin when the mixture is brought into an anhydrous condition, and atomizing the resulting aqueous mixture by means of a spray drier to form the powdery, fine, insoluble polymerized resin particles having sizes ranging from approximately 10 microns to 1000 microns.

2. A process for the production of powdery fine insoluble polymerized particles of anti ulcer medication for oral administration having a sustained release of the therapeutical ingredients contained therein, comprising blending (a) the powdery, fine insoluble polymerized resin particles containing an anti-chlorine ulcer medication substance which has been prepared in accordance with claim 1 by atomizing an aqueous mixture consisting of the anti-chlorine ulcer medication substance and a water-soluble resin capable of forming a water-insoluble resin during spray drying under anhydrous conditions, (b) powdery, fine antacid particles having the particles sizes almost the same as those of the (a) particles.

3. A process according to claim 1 wherein the water-soluble resin capable of conversion into a water-insoluble resin is selected from the group consisting of (a) condensation products derived from urea and formaldehyde;
(b) acrylic ester resins, vinyl acetate resins, crotonic acid resins and copolymers thereof; thereof;
(c) ammonium salts of acrylic acid, ammonium salts of crotonic acid and the ammonium salts of the copolymers of these acids with vinyl acetate acrylic ester and crotonic ester and
(d) an aqueous solution of polyvinyl alcohol obtained by dissolving a completely saponified polyvinyl alcohol in water.

References Cited
UNITED STATES PATENTS 3,079,303  2/1963  Raff et al. _____ 424—14X SHEP K. ROSE, Primary Examiner U.S. Cl. X.R.

424—22, 32, 33, 78, 81, 82, 154, 155; 264—121